May 11, 1965  J. G. HAWLEY ETAL  3,182,756
SELF-ENERGIZING HINGE TYPE RING DISC BRAKE
Filed Dec. 26, 1962  3 Sheets-Sheet 1
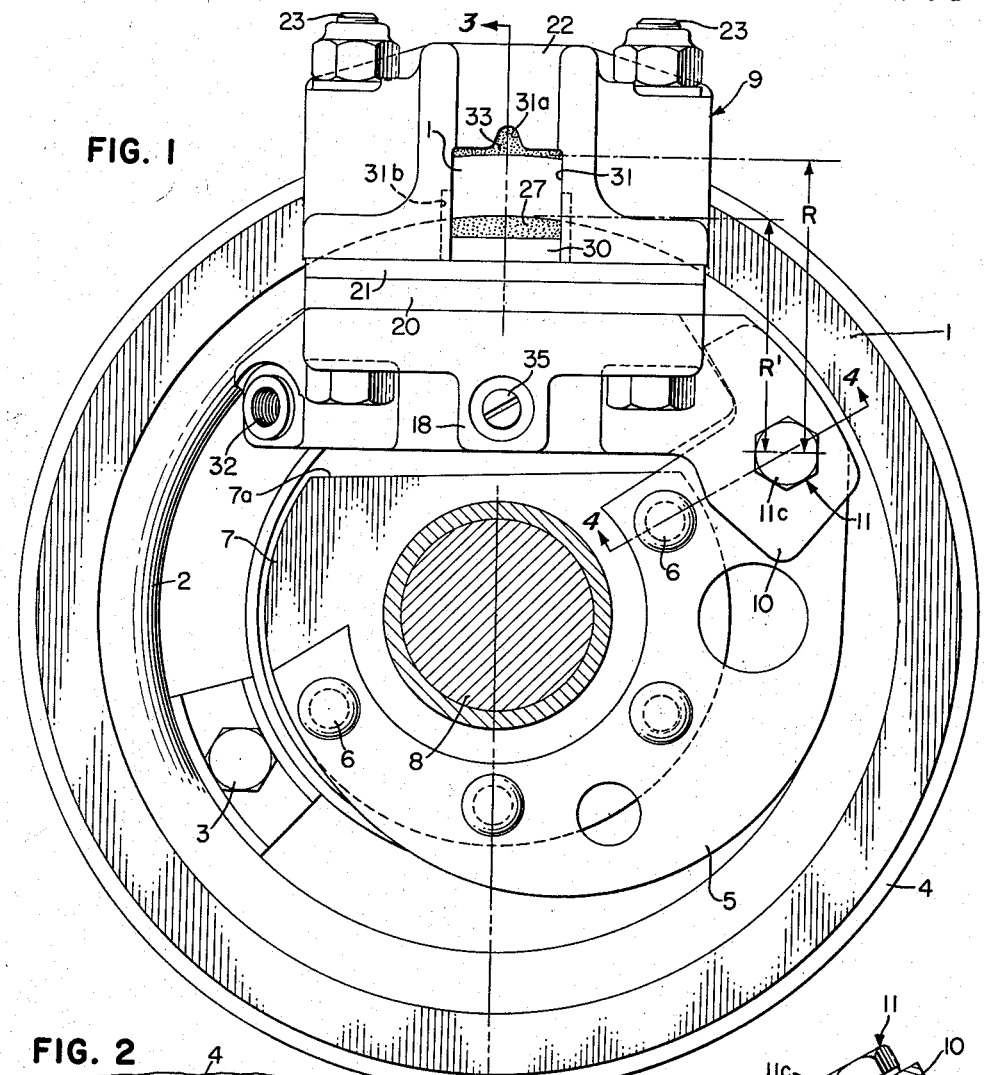
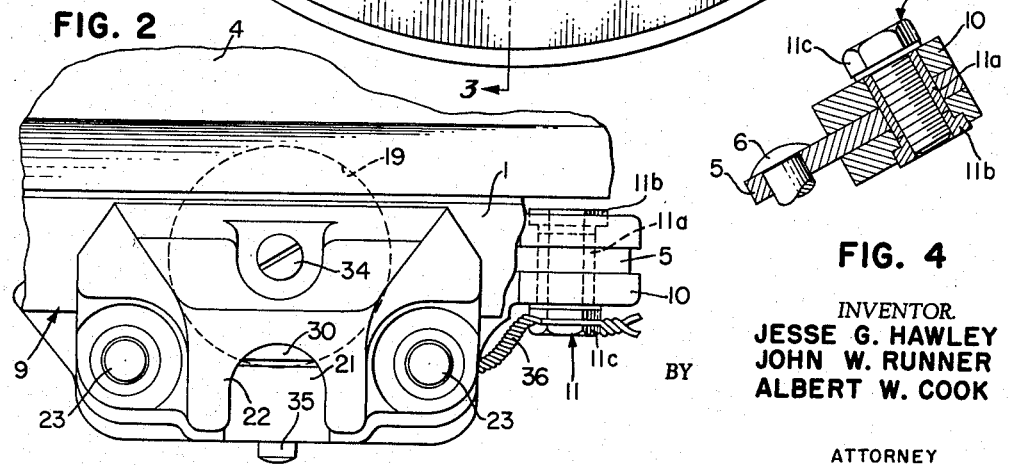
INVENTOR.
JESSE G. HAWLEY
JOHN W. RUNNER
ALBERT W. COOK
BY
ATTORNEY

INVENTOR.
JESSE G. HAWLEY
JOHN W. RUNNER
ALBERT W. COOK

ATTORNEY

May 11, 1965 J. G. HAWLEY ETAL 3,182,756
SELF-ENERGIZING HINGE TYPE RING DISC BRAKE
Filed Dec. 26, 1962 3 Sheets-Sheet 3

INVENTOR.
JESSE G. HAWLEY
JOHN W. RUNNER
ALBERT W. COOK
BY

ATTORNEY 3,182,756
SELF-ENERGIZING HINGE TYPE
RING DISC BRAKE
Jesse G. Hawley, Penn Yan, N.Y., and John W. Runner, Akron, and Albert W. Cook, Tallmadge, Ohio, assignors to The Goodyear Tire & Rubber Company, Akron, Ohio, a corporation of Ohio
Filed Dec. 26, 1962, Ser. No. 246,972
11 Claims. (Cl. 188—76)

This invention relates to spot type brakes for applying brake pressure simultaneously to relatively small areas of radially opposite sides of a rotating brake member.

Heretofore, it has been known to use a spot type of braking action, with much success. However, in the prior art some difficulty has been experienced from noisy operation, uneven disc wear, initial cost, maintenance cost, and complicated structure.

Therefore, it is the general object of the invention to avoid and overcome the foregoing and other difficulties of and objections to prior art practices by the provision of a simplified, self-energizing, inexpensive spot type brake structure characterized by excellent braking action, smallness of space requirements, ease of service, simplicity of structure, and reduction of noise.

Another object of the invention is the provision of a brake combination wherein the rotating member is fixed to the wheel or other element to be braked, and the brake unit is joined to a fixed torque plate by a single pin permitting the brake unit rotatable movement about the pin, the brake unit carrying a pair of friction buttons one adapted to engage with the radially outward surface of the rotating member and the other adapted to engage with the radially inner surface of the rotating member upon the application of fluid pressure.

Another object of the invention is to provide a lightweight low cost brake combination having small space requirements and wherein the brake pressure unit floats substantially radially to produce a radially directed pinch upon opposite surfaces of a rotatably mounted but axially and radially fixed endless brake ring of maximum radius and relatively heavy construction.

Another object of the invention is to provide a radially floating brake housing which can readily be removed for lining replacement.

Another object of the invention is to provide a brake unit where it is possible to inspect friction button wear and contact with the endless brake ring without any disassembly and by a simple visual inspection.

Another object of the invention is to provide a brake of the character described having a self energizing action, a high torque, adaptation to axle end play and deflection, easy wheel removal, and reduced cocking of linings.

The aforesaid objects of the invention, and other objects which will become apparent as the description proceeds, are achieved by providing in a brake combination a stationary torque plate, a rotatable ring disc, a brake unit hinged to the torque plate by a single pin to permit radial movement in relation to the axis of the ring disc, the brake unit including a C-clamp carrying a block of friction material adapted to engage with the radially outer surface of the brake drum, the brake unit slidably supporting a second block of friction material for radial movement into engagement with the radially inner surface of the brake drum, and means carried by the brake unit for forcibly engaging the blocks of friction material with the inner and outer faces of the brake drum.

For a better understanding of the invention reference should be had to the accompanying drawings wherein:

FIGURE 1 is a front elevation of one embodiment of brake incorporating the principles of the invention;

FIGURE 2 is a fragmentary top elevation of the brake of FIGURE 1;

FIGURE 4 is a horizontal cross sectional view through the brake unit taken substantially on line 4—4 of FIGURE 1.

Figure 3:
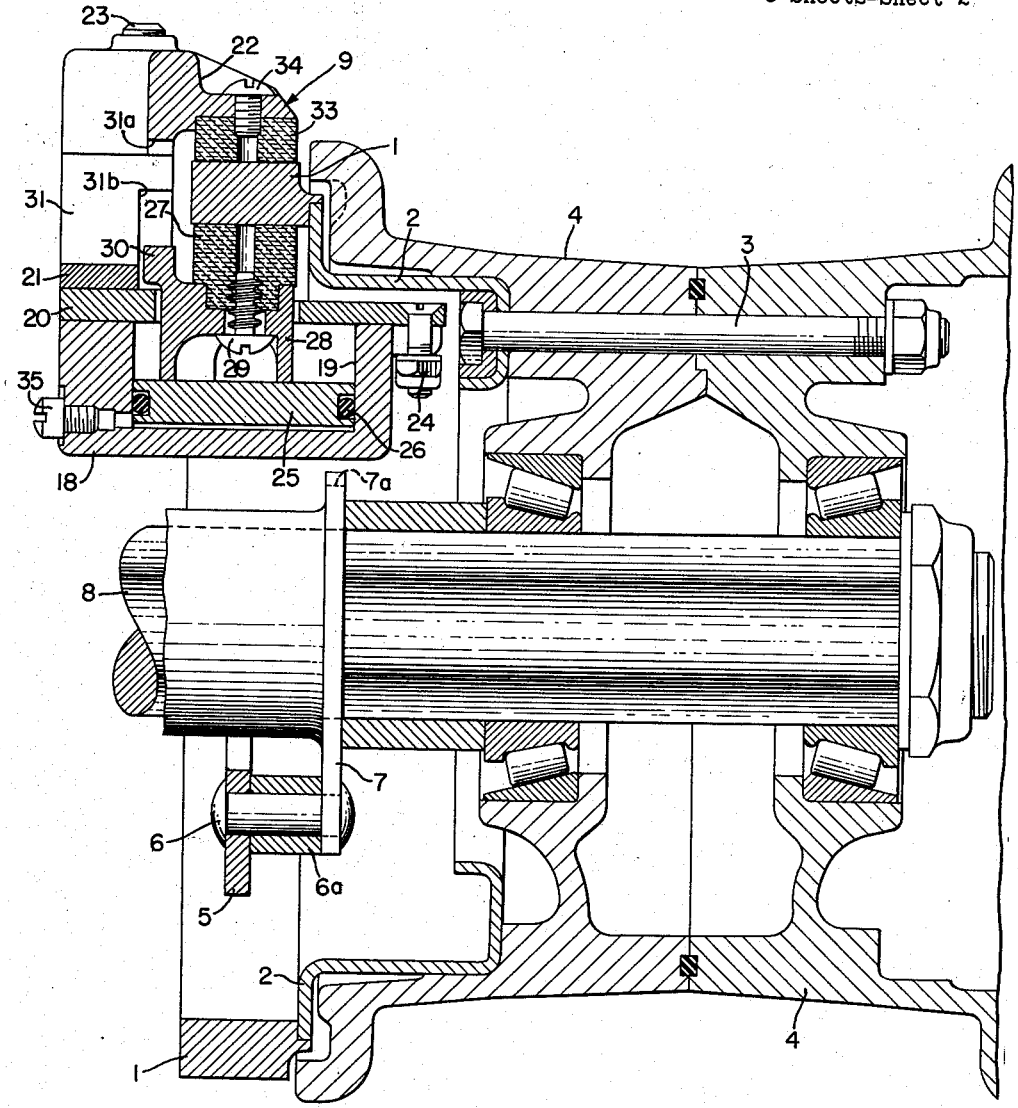
FIGURE 3 is a longitudinal cross sectional view through the brake unit taken substantially on the line 3—3 of FIGURE 1 and also showing the axle on which the brake is mounted.

In the drawings, the numeral 1 indicates generally the rotary brake member, this taking the form of a radially thick endless metal ring, preferably called a ring disc, welded at its inboard side to a steel cup 2 which is adapted to be fixedly secured at the base of the cup to bolts 3 which secure halves of wheel 4 together. The ring disc 1 is usually of inexpensive steel or cast iron which are less expensive materials than are normally required on flat disc brakes. In the embodiment of the invention shown the wheel is of cast magnesium.

The stationary portion of the brake assembly includes a metal torque plate 5 adapted to be secured, for example, at holes 6 by bolts, rivets, or suitable means to a flange 7 fixed to stationary axle 8 rotatably supporting the wheel 4. The torque plate 5 is spaced from flange 7 by spools 6a so as to align the torque plate 5 with the median plane of the ring disc 1. Also, the top of the flange 7 is flattened at 7a to allow clearance for the movement of the braking unit indicated as a whole by the numeral 9. The downward movement of the unit 9 is limited by engagement of the unit with the surface 7a of flange 7 before any metal portion of the unit engages the ring disc 1. The braking unit 9 is attached to the torque plate 5 by means of a bifurcated arm 10, pivotally hinged thereto by means indicated generally by the numeral 11. These means include a sleeve 11a positioned in aligned holes, a hexogonal nut 11b fitting into a hexagonal recess to hold it against turning, and a cap screw 11c extending through sleeve 11a and screwing into the nut 11b.

Figure 5:
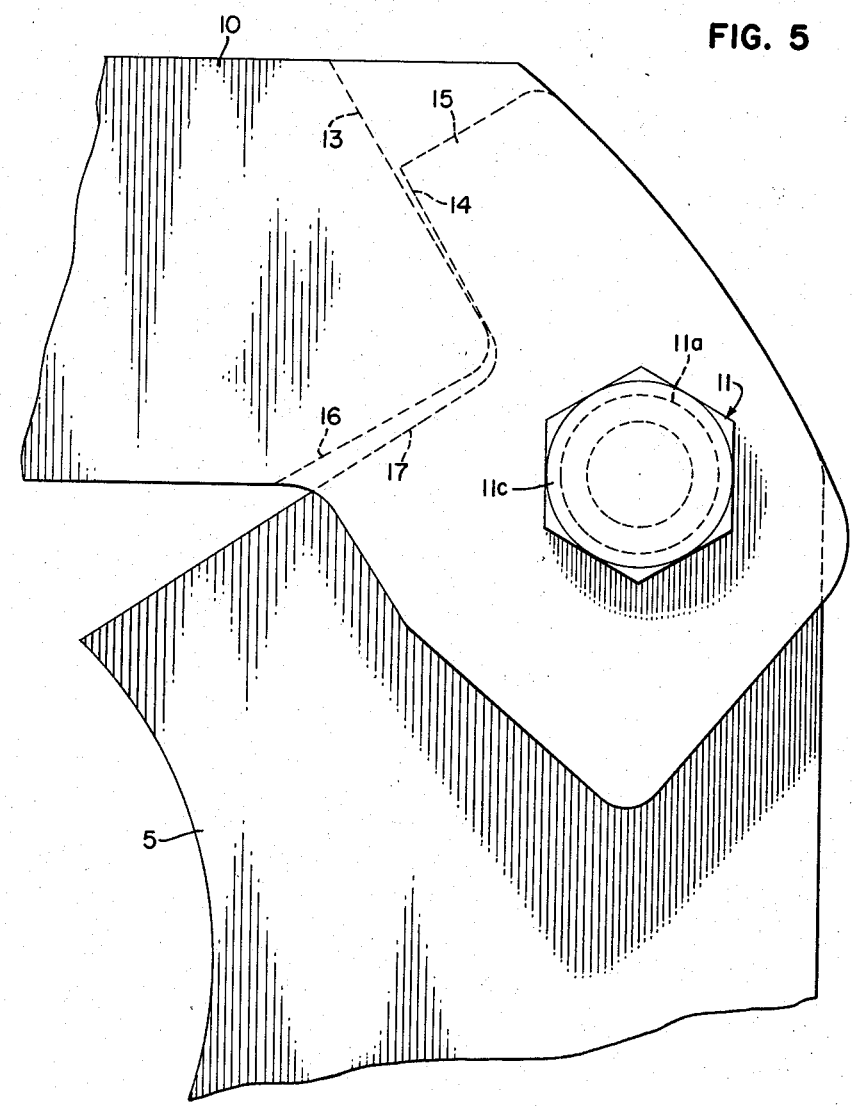
FIGURE 5 is an enlarged fragmentary front view of the hinge-pin arrangement between the fixed torque plate and the brake unit.

With reference to FIGURES 1 and 5, it can be seen how the bifurcated arm 10 from the brake unit extends over the protruding flange of the torque plate 5, and how pivotal hinging action of the brake unit 9 on the torque plate is accomplished by the means 11. Looking at FIGURE 1, the brake unit 9 tends to pivot or rotate clockwise if wheel rotation is clockwise and braking pressure is applied, and conversely with the wheel rotation counterclockwise the brake unit tends to pivot or rotate counterclockwise when braking pressure is applied. The pivot means 11 lies radially within the ring disc 1 so that braking torque is taken on the means in the center plane of the ring disc. Preferably the screw 11c is tightened so as to apply a frictional resistance to the turning of the brake unit 9 on the torque plate 5 for example, so that a force of five pounds is required to swing the end of the unit 9 about the means 11. This reduces brake noise and any push-in of the brake piston from a jar.

Having reference to FIGURE 5, when brake unit 9 pivots clockwise it causes the bifurcated arm 10 to move clockwise causing shoulder 13 of arm 10 to contact shoulder 14 of finger 15 of torque plate 5, thus limiting the clockwise rotation of brake unit 9, so as prevent any metal portion of the brake unit from ever rubbing on the disc 1. Conversely, if brake unit 9 pivots counter-clockwise shoulder 16 of bifurcated arm 10 does not contact shoulder 17 of torque plate 5. The counter-clockwise rotation of brake unit 9 is limited by the bottom of the brake unit 9 striking the upper surface 7a of the flange 7 as previously described thereby giving an indication from the feel of brake operation that relining is advisable.

The brake unit 9 includes a housing made up of a lower or radially inner portion 18 formed with a piston-receiving chamber 19, a torque-carrying plate 20, a shim plate 21, and an upper or radially outer portion of inverted U-shaped 22, the parts being held together with a pair of bolts 23. Torque-carrying plate 20 is additionally secured to the lower housing portion 18 with bolt 24. The upper surface of plate 20 within the cup 2 is machined on a curve to provide clearance with the cup. The housing is of a C-shape in vertical section, as best seen in FIGURE 3 so as to straddle ring disc 1. By dispensing with the shim plate 21 or using other thicknesses of shim plates the brake unit can be used with brakes having ring discs 1 of different radial thickness.

A slidable piston 25, having O-ring 26, is received in cylinder 19 with a friction button 27 affixed to a sub-piston 28 by screw 29. The sub-piston 28 is preferably a light die casting which is thrown away with the worn friction button 27 upon brake relining, and with the new friction button having a new sub-piston furnished with it. The sub-piston 28 merely rests on top of the piston 25 and extends slidably through a hole in the torque-carrying plate 20. Thus upon braking the torque imparted to the friction button 27 is transmitted through the sub-piston 28, the torque-carrying plate 20, the unit 9, and pivot means 11 back to the torque plate 5.

The sub-piston 28 is formed with an upwardly and outwardly extending integral lug 30 which is slidably received within the window 31 of the upper portion 22 of the housing so as to hold the friction button 27 against tilting or turning. In order to further enhance this action the sides of the window 31 are preferably grooved at 31b to slidably receive the edges of the lug 30.

Completing the assembly of the brake unit 9, a friction button 33 is secured by screw 34 in the upper and outer portion 22, as best seen in FIGURE 3.

When fluid under pressure is applied through a flexible conduit (not shown) connected to opening 32 it forces piston 25 upward causing friction button 27 to engage with the ring disc 1. As pressure is applied by friction button 27 to the ring disc 1 it causes an equal and opposite pressure which pivots or rotates the brake unit 9 on the pivot means 11 in a counter-clockwise direction when looking at FIGURE 1. This rotation of the brake unit 9 causes a friction button 33 mounted in the upper housing portion 22 to be pulled downward engaging the top radial surface of ring disc 1. The self energizing action then follows as hereinafter described.

A drain and bleeder plug 35 is provided in the bottom of the brake unit housing. A lock wire 36 is provided to lock the cap screw 11c of pivot means 11 in its adjusted position.

One of the main advantages of the invention is the ease and simplicity of maintenance and servicing. To remove the brake unit 9 from the wheel 4, one simply has to remove pivot means 11 and the fluid supply conduit at opening 32, and the brake unit is free from the wheel. Usually it is unnecessary to even remove the fluid supply conduit because there is enough flexibility therein to allow replacement of the friction buttons in the brake unit. It is then an easy matter to remove screw 34 and the worn upper friction button 33. Enough room is now provided to pick out worn button 27 and its sub-piston 28 and replace these. A new button 33 is then secured in place and the brake unit 9 is ready for remounting.

Also, it is possible to inspect wear on the friction buttons by simply looking through the window 31 of the upper housing portion 22 where the ring 1 and both friction buttons 33 and 27 are visible as seen in FIGURE 1. To increase the visibility of the upper friction button 33 over substantially its full thickness the window opening 31 is notched at 31a at its top. In this manner it is possible to keep a check on the wear of the buttons to be sure that the brake is functioning properly, and linings are properly replaced on a planned basis rather than on an emergency basis.

The self energizing action of the brake is achieved when the ring disc 1 rotates in the direction of the arrow of FIGURE 1 and the brake is applied. The frictional drag between button 33 and ring disc 1 then acts on radius R and the frictional drag between button 27 and the ring disc 1 acts on a radius $R^1$ to provide a turning movement about hinge means 11 to brake unit 9 to force the button 33 still more tightly into engagement with the outer periphery of the ring disc 1. The button 27 would tend to move away from the inner periphery of the ring disc 1 under the self-energizing action but the fluid pressure behind the piston 25 still keeps the button 27 in engagement with the ring disc with the fluid pressure. Thus, the friction buttons 27 and 33 are still held in braking engagement with the fluid pressure forces, but, in addition, the button 33 is pressed against the ring disc 1 with the self-energizing force described. The length of the radii R and $R^1$ can be increased or decreased by rearranging the pivot pin position. Also, the coefficient of friction of the buttons 33 and 27 can be altered by the use of different composition friction buttons to further control the extent of the self-energizing action. Usually the button 33 has a lower coefficient of friction than button 27.

By virtue of the self-energizing feature described, the brake can be designed for a desired controllable additional torque, usually up to about one-third more torque. The brake friction radius is greater than in most brakes with the ring disc 1 being out adjacent the bead seat of the pneumatic tire. Thus, an operator can handle a much heavier vehicle with no large brake and with no more effort on the brake pedals.

The self-energizing action described is controllable and not tricky. It is obtained by pulling at a proper angle against the pivot pin 11 instead of by pushing against a pivot pin as in an internal shoe type drum brake, such as an auto brake, wherein the shoe tends to spring and wind up on the anchor pivot resulting in brake grab from the self-energizing action.

It will be recognized that the objects of the invention have been achieved. Brake heat to the bead of a tire mounted on the brake wheel is reduced. Torque is transmitted to the axle in the center of the plane of the ring disc so that eccentricities are eliminated. Maintenance and cost of operation is greatly reduced because the brake linings or buttons are readily visible through an opening the brake unit itself so that the necessity for lining replacement can be easily determined by planned maintenance inspections. The brake unit is removable by the simple removal of a single pivot means to allow lining replacement without jacking or wheel removal and with minimum maintenance time. Wheel removal is also simplified. Uncontrolled tilting of linings is greatly reduced. The brake unit can be utilized with ring discs of different thickness. The brake unit can move to and from the axle but not axially thereof, but with end play of the wheel in its bearings not adversely effecting the braking action on the ring disc.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. The combination in a brake of an axle, a wheel having side flanges rotatably mounted on the axle, a ring-disc, a cup-shaped member securing the ring disc to the wheel adjacent a side flange of the wheel, the member being secured to the base of the wheel and otherwise spaced from the wheel, a torque flange secured to the axle, a C-shaped brake unit straddling the ring-disc, a single pivot means pivotally securing the unit to the torque flange so the pivot means lies in substantially the central plane of the ring disc, friction blocks in said unit adapted to engage in opposed relationship with the radially outer and the radially inner surfaces of the ring-disc, and means for moving the blocks into engagement.

2. The combination in a brake of a fixed member, a rotary member mounted for rotation relative to the fixed member, a ring-disc, means securing the ring-disc to the rotary member, a C-shaped brake unit straddling the ring-disc, a first friction block operatively carried by said brake unit, a second friction block slidably carried by said brake unit, said friction blocks in the unit adapted to engage in opposed relationship the radially inner and outer surfaces of the ring-disc, means carried by the unit for moving said second friction block into engagement with the ring disc, and means pivotally mounting the unit on the fixed member and in the central plane of the ring disc so that upon movement of the second friction block into engagement with the ring-disc a self energizing force is generated tending to turn the brake unit about the pivotal means so that the first friction block is forced against the ring disc and so that at least one of the blocks is forced into harder engagement with the ring-disc.

3. The combination recited in claim 2 wherein the pivot means is positioned inside and in the central plane of the ring-disc and the self energizing force is directed to force the friction block engaging the radially outer surface of the ring-disc into harder engagement therewith in a self-energizing action.

4. The combination in a brake of an axle, a wheel rotatably mounted on the axle and adapted to carry a beaded pneumatic tire, a ring-disc, a cup-shaped member securing the ring disc to the wheel adjacent the side of the bead seat for the tire, the member being secured to the base of the wheel and otherwise spaced from the wheel, a torque flange secured to the axle in substantially the central plane of the ring disc, a C-shaped brake unit straddling the ring-disc, a single pivot means pivotally securing the unit to the torque flange with an adjustable friction against pivotal movement, said unit including a radially inner portion, a radially outer portion, an interposed torque-carrying plate and bolt means lying to the outboard side of the ring disc securing the unit together, a block of friction material releasably carried by the outer portion and adapted to engage the radially outer surface of the ring disc, a piston slidably mounted in a cylinder opening in the inner portion, a sub-piston engaging with the piston and extending slidably through the torque-carrying plate, a block of friction material carried by the sub-piston and adapted to engage with the radially inner surface of the ring disc, the outer portion having a window therein exposing the engagement between the ring disc and the blocks of friction material to view, lug means formed on the sub-piston and slidably engaging with the sides of the window to hold the block of friction material carried by the sub-piston against tilting and rotation, and means for supplying fluid under pressure behind the piston.

5. The combination in a brake of an axle, a wheel rotatably mounted on the axle and adapted to carry a beaded pneumatic tire, a ring-disc, means securing the ring disc to the wheel, a torque flange secured to the axle in substantially the central plane of the ring disc, a C-shaped brake unit straddling the ring-disc, a single pivot means pivotally securing the unit to the torque flange with an adjustable friction against pivotal movement, said unit including a radially inner portion, a radially outer portion, an interposed torque-carrying plate and bolt means lying to the outboard side of the ring disc securing the unit together, a block of friction material releasably carried by the outer portion and adapted to engage the radially outer surface of the ring disc, a piston slidably mounted in a cylinder opening in the inner portion, a sub-piston engaging with the piston and extending slidably through the torque-carrying plate, a block of friction material carried by the sub-piston and adapted to engage with the radially inner surface of the ring disc, the outer portion having a window therein exposing the engagement between the ring disc and the blocks of friction material to view, lug means formed on the sub-piston and slidably engaging with the sides of the window to hold the block of friction material carried by the sub-piston against tilting and rotation, and means for supplying fluid under pressure behind the piston.

6. The combination in a brake of an axle, a wheel rotatably mounted on the axle and adapted to carry a beaded pneumatic tire, a ring-disc, means securing the ring disc to the wheel, a torque flange secured to the axle, a C-shaped brake unit straddling the ring-disc, a single pivot means pivotally securing the unit to the torque flange, said unit including a radially inner portion, a radially outer portion, an interposed torque-carrying plate and bolt means lying to the outboard side of the ring disc securing the unit together, a block of friction material releasably carried by the outer portion and adapted to engage the radially outer surface of the ring disc, a piston slidably mounted in a cylinder opening in the inner portion, a sub-piston engaging with the piston and extending slidably through the torque-carrying plate, a block of friction material carried by the sub-piston and adapted to engage with the radially inner surface of the ring disc, the outer portion having a window therein exposing the engagement between the ring disc and the blocks of friction material to view, lug means formed on the sub-piston and slidably engaging with the sides of the window to hold the block of friction material carried by the sub-piston against tilting and rotation, and means for supplying fluid under pressure behind the piston.

7. The combination in a brake of an axle, a wheel rotatably mounted on the axle and adapted to carry a beaded pneumatic tire, a ring-disc, means securing the ring disc to the wheel, a torque flange secured to the axle, a C-shaped brake unit straddling the ring-disc, a single pivot means pivotally securing the unit to the torque flange, said unit including a radially inner portion, a radially outer portion, an interposed torque-carrying plate and bolt means lying to the outboard side of the ring disc securing the unit together, a block of friction material releasably carried by the outer portion and adapted to engage the radially outer surface of the ring disc, piston means slidably mounted in a cylinder opening in the inner portion and extending slidably through the torque-carrying plate, a block of friction material carried by the piston means and adapted to engage with the radially inner surface of the ring disc, the outer portion having a window therein exposing the engagement between the ring disc and the blocks of friction material to view, means to hold the block of friction material carried by the piston means against tilting and rotation, and means for supplying fluid under pressure behind the piston means.

8. The combination in a brake of a fixed member, a rotary member mounted on the fixed member, a ring disc, means securing the ring disc to the rotary member, a torque flange secured to the fixed member and in substantially the central plane of the ring disc, a C-shaped brake unit straddling the ring-disc, a single pivot means pivotally securing the unit to the torque flange with an adjustable friction against pivotal movement, said unit including a radially inner portion, a radially outer portion, an interposed torque-carrying plate and bolt means lying to the outboard side of the ring disc securing the unit together, a block of friction material releasably carried by the outer portion and adapted to engage the radially outer surface of the ring disc, a piston slidably mounted in a cylinder opening in the inner portion, a sub-piston engaging with the piston and extending slidably through the torque-carrying plate, a block of friction material carried by the sub-piston and adapted to engage with the radially inner surface of the ring disc, the outer portion having a window therein exposing the engagement between the ring disc and the blocks of friction material to view, lug means formed on the sub-piston and slidably engaging with the sides of the window to hold the block of friction material carried by the sub-piston against tilting and rotation, and means for supplying fluid under pressure behind the piston.

9. In a brake the combination of
an axle,
a wheel rotatably mounted on the axle and adapted to carry a tire,
a ring disc,
means securing the ring disc to the wheel,
a torque flange secured to the axle,
a C-shaped brake unit straddling the ring disc, said unit including a radially inner portion, a radially outer portion, and means securing these portions together to comprise the brake unit,
a single pivot means pivotally securing the brake unit to the torque flange,
a block of friction material releasably carried by the outer portion of the brake unit and adapted to engage the radially outer surface of the ring disc,
piston means slidably mounted in a cylinder opening in the inner portion of the brake unit,
a block of friction material carried by the piston means and adapted to engage with the radially inner surface of the ring disc,
means to hold the block of friction material carried by the piston means against tilting and rotation, and
means for supplying fluid under pressure behind the piston means.

10. In a brake the combination of
a fixed member,
a rotary member mounted on the fixed member,
a ring disc operatively secured to the rotary member,
a torque flange secured to the fixed member and in substantially the central plane of the ring disc,
a brake unit straddling the ring disc, said unit including a radially inner portion, a radially outer portion, and means securing these portions together to comprise the brake unit,
a single means pivotally securing the brake unit to the torque flange with an adjustable friction against pivotal movement,
a block of friction material releasably carried by the outer portion of the brake unit and adapted to engage the radially outer surface of the ring disc,
piston means slidably mounted in a cylinder opening in the inner portion of the brake disc,
a block of friction material carried by the piston means and adapted to engage with the radially inner surface of the ring disc,
means to hold the block of friction material carried by the piston means against tilting and rotation, and
means for supplying fluid under pressure behind the piston means.

11. In a brake the combination of
an axle,
a wheel rotatably mounted on the axle,
a ring disc operatively secured to the wheel,
a torque flange secured to the axle,
a brake unit straddling the ring disc,
friction blocks in said brake unit adapted to engage in opposed relation with the radially outer and the radially inner surface of the ring disc,
a single pivot means pivotally securing the brake unit to the torque flange, said pivot means including an interlock between the brake unit and the torque flange which limits the pivotal movement of the brake unit with respect to the torque flange in both directions so that regardless of the wear on the friction blocks there can be no contact of the brake unit with the ring disc,
adjustable friction means holding the pivot means against pivotal movement, and
means for moving the friction blocks into engagement with the ring disc.

References Cited by the Examiner
UNITED STATES PATENTS

| | | | |
|---|---|---|---|
| 1,646,932 | 10/27 | Rosenberg | 188—76 |
| 2,710,675 | 6/55 | Murphy | 188—76 |
| 2,783,858 | 3/57 | Murphy | 188—76 |
| 3,052,327 | 9/62 | Yazell et al. | 188—76 |

ARTHUR L. LA POINT, *Primary Examiner.*